United States Patent
Jun et al.

(10) Patent No.: US 9,330,847 B2
(45) Date of Patent: May 3, 2016

(54) CONDUCTIVE PASTE FOR EXTERNAL ELECTRODES AND MULTILAYER CERAMIC ELECTRONIC COMPONENT MANUFACTURED USING THE SAME

(71) Applicant: SAMSUNG ELECTRO-MECHANICS CO., LTD., Suwon-Si, Gyeonggi-Do (KR)

(72) Inventors: Byung Ho Jun, Suwon-Si (KR); Jung Wook Seo, Suwon-Si (KR)

(73) Assignee: SAMSUNG ELECTRO-MECHANICS CO., LTD., Suwon-Si, Gyeonggi-Do (KR)

( * ) Notice: Subject to any disclaimer, the term of this patent is extended or adjusted under 35 U.S.C. 154(b) by 210 days.

(21) Appl. No.: 14/256,590

(22) Filed: Apr. 18, 2014

(65) Prior Publication Data
US 2015/0213953 A1    Jul. 30, 2015

(30) Foreign Application Priority Data

Jan. 27, 2014  (KR) ........................ 10-2014-0009718

(51) Int. Cl.
*H01G 4/232* (2006.01)
*H01B 1/22* (2006.01)
*H01G 4/30* (2006.01)
*H01G 4/12* (2006.01)

(52) U.S. Cl.
CPC .............. *H01G 4/2325* (2013.01); *H01B 1/22* (2013.01); *H01G 4/30* (2013.01); *H01G 4/12* (2013.01)

(58) Field of Classification Search
CPC ......... H01G 4/30; H01G 4/228; H01G 4/232; H01G 4/2325; H01G 4/248; H01G 4/252
See application file for complete search history.

(56) References Cited

U.S. PATENT DOCUMENTS

| 4,761,303 A * | 8/1988 | Ruszczyk | H05K 3/181 174/256 |
| 2006/0098065 A1* | 5/2006 | Maruyama | C01G 3/02 347/100 |
| 2013/0258546 A1* | 10/2013 | Kim | H01G 4/12 361/301.4 |
| 2014/0029157 A1* | 1/2014 | Kwag | H01G 4/30 361/301.4 |
| 2014/0233147 A1* | 8/2014 | Hong | H01G 4/008 361/301.4 |

FOREIGN PATENT DOCUMENTS

| KR | 10-0586962 B1 | 6/2006 |
| KR | 10-2010-0110891 A | 10/2010 |
| WO | 2005-055257 A1 | 6/2005 |

* cited by examiner

*Primary Examiner* — Dion R Ferguson
(74) *Attorney, Agent, or Firm* — McDermott Will & Emery LLP

(57) ABSTRACT

A multilayer ceramic electronic component may include: a ceramic body including a plurality of dielectric layers and a plurality of internal electrodes; electrode layers disposed on outer surfaces of the ceramic body to be electrically connected to the internal electrodes and containing a conducive metal and glass; and a conductive resin layer disposed on the electrode layer and containing first copper particles, second copper particles smaller than the first copper particles, copper oxide particles smaller than the second copper particles, and a base resin. The copper oxide particles have a particle size of 20 nm or less.

14 Claims, 3 Drawing Sheets

CONDUCTIVE PASTE FOR EXTERNAL ELECTRODES AND MULTILAYER CERAMIC ELECTRONIC COMPONENT MANUFACTURED USING THE SAME

CROSS-REFERENCE TO RELATED APPLICATION

This application claims the benefit of Korean Patent Application No. 10-2014-0009718 filed on Jan. 27, 2014, with the Korean Intellectual Property Office, the disclosure of which is incorporated herein by reference.

BACKGROUND

The present disclosure relates to a conductive paste for external electrodes and a multilayer ceramic electronic component manufactured using the same.

A multilayer ceramic electronic component includes a plurality of stacked dielectric layers, internal electrodes facing each other, having at least one of the dielectric layers interposed therebetween, and external electrodes electrically connected to the internal electrodes.

The multilayer ceramic electronic component has been widely used in mobile communications devices such as computers, personal digital assistants (PDAs), cellular phones, and the like, due to advantages such as a small size, high capacitance, easiness of mounting, and the like.

Recently, as electronic products have been miniaturized and multi-functionalized, chip components also tend to be miniaturized and multi-functionalized. Accordingly, a multilayer ceramic electronic component is also required to have a small size and high capacitance.

To this end, a multilayer ceramic electronic component in which the number of stacked dielectric layers is increased through the dielectric layers and internal electrodes having reduced thicknesses, and thicknesses of external electrodes formed on the exterior thereof have also been reduced.

In addition, as many functions in devices requiring high reliability, such as vehicle control systems or medical devices, are digitized and demand therefor increases, multilayer ceramic capacitors are also required to have high reliability in order to meet the demands above.

Causes of reliability problems may include a plating solution infiltration occurring in a plating process, cracking due to external shocks, and the like.

In order to solve the above-described problems and improve reliability, a resin composition containing a conductive material may be applied to electrode layers of the external electrodes to absorb an external shock and prevent a plating solution from being infiltrated.

RELATED ART DOCUMENT (Patent Document 1) Korean Patent No. KR 10-0586962

SUMMARY

An aspect of the present disclosure may provide a conductive paste for external electrodes and a multilayer ceramic electronic component manufactured using the same.

According to an aspect of the present disclosure, a multilayer ceramic electronic component may include: a ceramic body including a plurality of dielectric layers and a plurality of internal electrodes; electrode layers disposed on outer surfaces of the ceramic body to be electrically connected to the internal electrodes and containing a conducive metal and glass; and a conductive resin layer disposed on the electrode layer and containing first copper particles, second copper particles smaller than the first copper particles, copper oxide particles smaller than the second copper particles, and a base resin, wherein the copper oxide particles may have a particle size of 20 nm or less.

50% or greater of the copper oxide particles contained in the conductive resin layer may be disposed on surfaces of the second copper particles.

The copper oxide particles may have a particle size of 2 nm to 15 nm.

The second copper particles may have a particle size of 50 nm to 200 nm.

The copper oxide particles may be contained in 2 to 20 parts by weight, based on 100 parts by weight of the first and second copper particles.

The conductive resin layer may contain the second copper particles and the copper oxide particles in a ratio of 2:1 to 20:1.

The first copper particles may have a particle size of 1 µm or more.

The first copper particles may have a particle size of 1 µm to 2.5 µm.

According to another aspect of the present disclosure, a conductive paste for external electrodes may include: first copper particles; second copper particles smaller than the first copper particles; copper oxide particles having a particle size of 20 nm or less; and a base resin.

The second copper particles may have a particle size of 50 nm to 200 nm.

The copper oxide particles may be contained in 2 to 20 parts by weight, based on 100 parts by weight of the first and second copper particles.

The second copper particles and the copper oxide particles may be contained in a ratio of 2:1 to 20:1.

The first copper particles may have a particle size of 1 µm or more.

The first copper particles may have a particle size of 1 µm to 2.5 µm.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Figure 1:
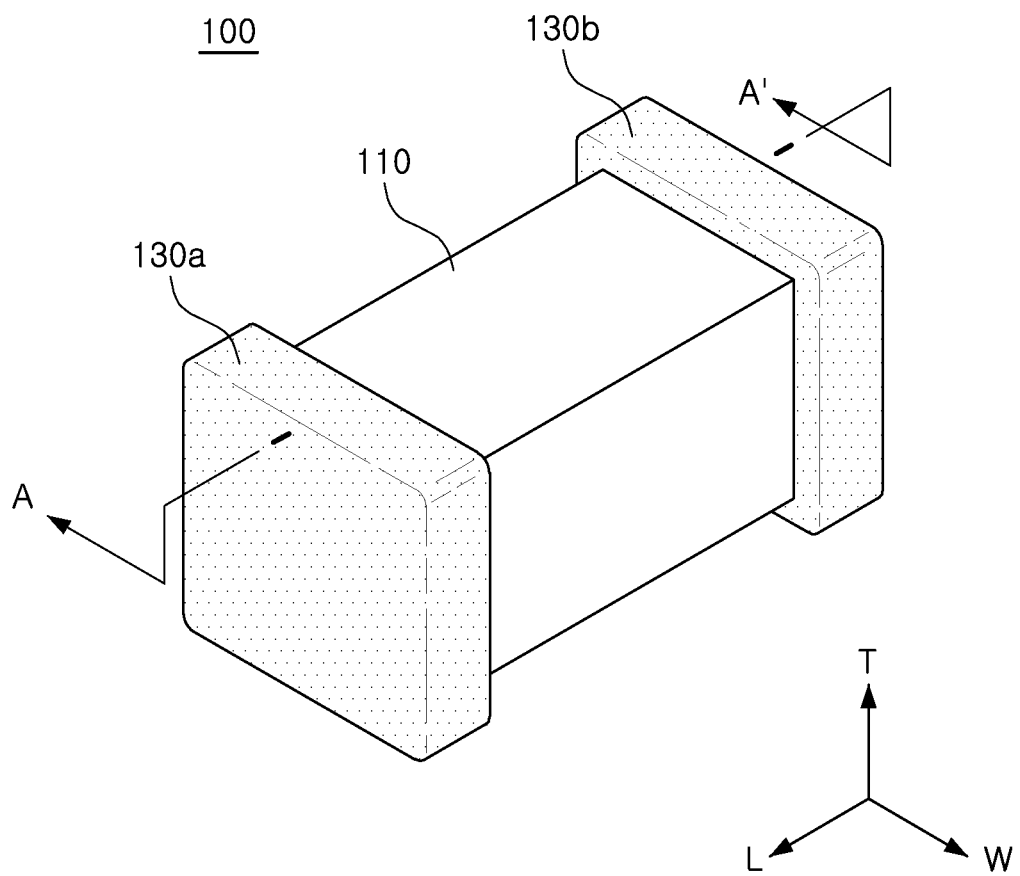
FIG. 1 is a perspective view schematically showing a multilayer ceramic electronic component according to an embodiment of the present disclosure.

Exemplary embodiments of the present disclosure will now be described in detail with reference to the accompanying drawings.

The disclosure may, however, be embodied in many different forms and should not be construed as being limited to the embodiments set forth herein. Rather, these embodiments are provided so that this disclosure will be thorough and complete, and will fully convey the scope of the disclosure to those skilled in the art.

In the drawings, the shapes and dimensions of elements may be exaggerated for clarity, and the same reference numerals will be used throughout to designate the same or like elements.

Figure 2:
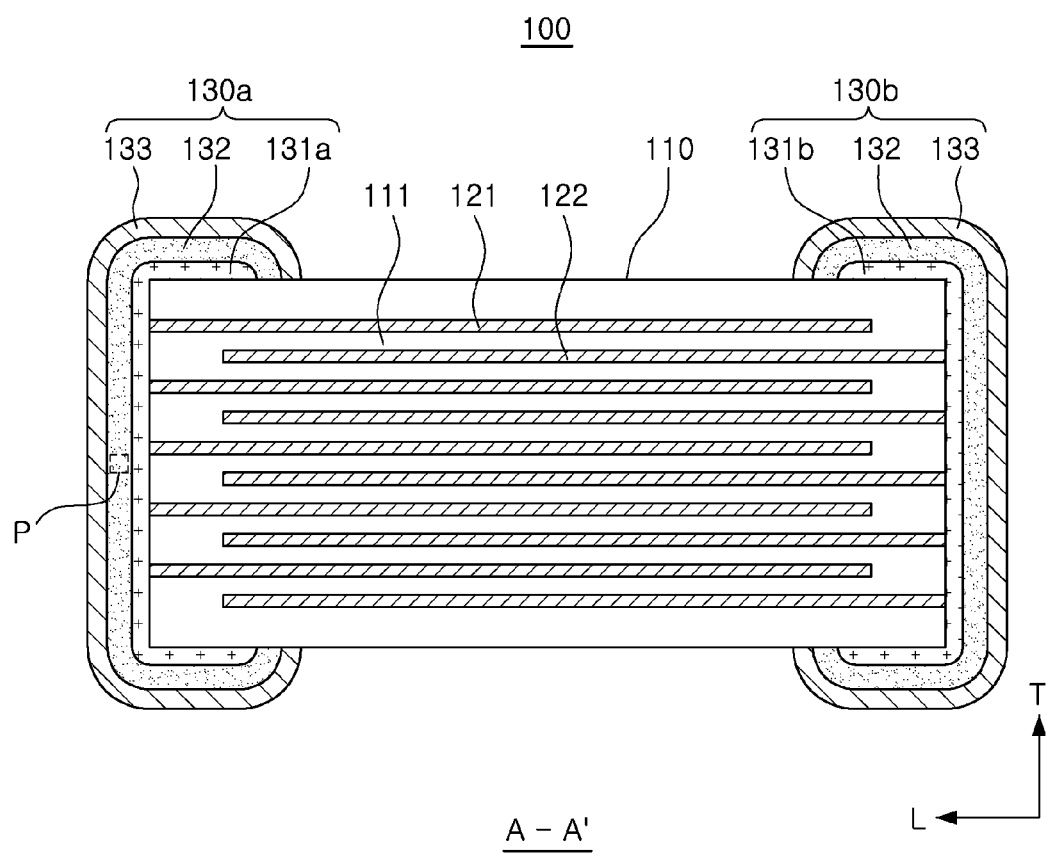
FIG. 2 is a cross-sectional view taken along line A-A' of FIG. 1.

FIG. 1 is a perspective view showing a multilayer ceramic electronic component according to an exemplary embodiment of the present disclosure, and FIG. 2 is a cross-sectional view taken along line A-A' of FIG. 1.

Figure 3:
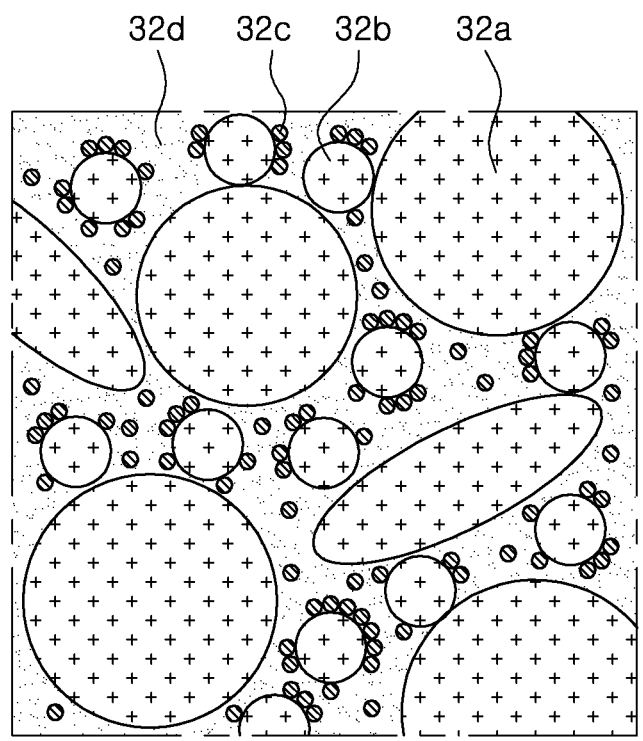
FIG. 3 is an enlarged view of part P of FIG. 2.

FIG. 3 is an enlarged view of part P of FIG. 2.

Referring to FIGS. 1 and 2, a multilayer ceramic electronic component 100 according to an exemplary embodiment of the present disclosure may include a ceramic body 110 and external electrodes 130a and 130b.

The ceramic body 110 may include an active layer contributing to forming capacitance and upper and lower cover layers formed on and below the active layer as upper and lower margin parts, respectively. The active layer may include dielectric layers 111 and internal electrodes 121 and 122.

In the exemplary embodiment of the present disclosure, a shape of the ceramic body 110 is not particularly limited, but the ceramic body 110 may be substantially hexahedral. The ceramic body 110 may not have a perfectly hexahedral shape, but may have a shape substantially similar to a hexahedron, due to sintering shrinkage of a ceramic powder at the time of a sintering process of a chip, a thickness difference according to presence or absence of internal electrode patterns, and a polishing process of corner or edge portions of the ceramic body.

Directions of a hexahedron will be defined in order to clearly describe exemplary embodiments of the present disclosure. L, W and T shown in the accompanying drawings refer to a length direction, a width direction, and a thickness direction, respectively. Here, the thickness direction may be the same as a direction in which dielectric layers are stacked.

The internal electrodes may include the first internal electrodes 121 and the second internal electrodes 122, and the first and second internal electrodes may be disposed to face each other, having the dielectric layer 111 interposed therebetween. The first and second internal electrodes 121 and 122, a pair of electrodes having different polarities, may be formed by printing a conductive paste including a conductive metal on the dielectric layers 111 at a predetermined thickness. The pair of first and second internal electrodes 121 and 122 may be alternately exposed to both end surfaces of the ceramic body and may be electrically insulated from each other by the dielectric layer 111 disposed therebetween.

That is, the first and second internal electrodes 121 and 122 may be electrically connected to the external electrodes 130a and 130b through portions thereof alternately exposed to both end surfaces of the ceramic body 110. More specifically, the external electrodes may include the first and second external electrodes 130a and 130b, wherein the first internal electrodes 121 may be electrically connected to the first external electrode 130a and the second internal electrodes 122 may be electrically connected to the second external electrode 130b.

Therefore, in the case in which voltage is applied to the first and second external electrodes 130a and 130b, electric charges are accumulated between the first and second internal electrodes 121 and 122 facing each other. Here, capacitance of the multilayered ceramic capacitor 100 is in proportion to an area of a region in which the first and second internal electrodes 121 and 122 are overlapped with each other.

A thickness of the first and second internal electrodes 121 and 122 may be determined depending on intended use.

In addition, the conductive metal included in the first and second internal electrodes 121 and 122 may be nickel (Ni), copper (Cu), palladium (Pd), or an alloy thereof, but is not limited thereto.

Here, the thickness of the dielectric layer 111 may be arbitrarily changed according to a target capacitance of the multilayered ceramic capacitor.

Further, the dielectric layer 111 may contain ceramic powder having high permittivity, for example, barium titanate ($BaTiO_3$) based powder or strontium titanate ($SrTiO_3$) based powder, or the like, but is not limited thereto.

The upper and lower cover layers may have the same material and configuration as those of the dielectric layers 111, except that they do not include the internal electrodes. The upper and lower cover layers may be formed by stacking a single dielectric layer or two or more dielectric layers on respective upper and lower surfaces of the active layer in a vertical direction, and may serve to prevent the first and second internal electrodes 121 and 122 from being damaged by physical or chemical stress.

The external electrodes 130a and 130b may include electrode layers 131a and 131b and conductive resin layers 132 formed on the electrode layers.

The external electrodes may include the first external electrode 130a and the second external electrode 130b, and the electrode layers may include a first electrode layer 131a and a second electrode layer 131b.

For example, the first external electrode 130a may include the first electrode layer 131a and the conductive resin layer 132, and the second external electrode 130b may include the second electrode layer 131a and the conductive resin layer 132.

The first and second electrode layers 131a and 131b may be directly connected to the first and second internal electrodes 121 and 122 to secure an electrical connection between the external electrodes and the internal electrodes.

The first and second electrode layers 131a and 131b may contain a conductive metal and glass, and the conductive metal may be nickel (Ni), copper (Cu), palladium (Pd), gold (Au), or an alloy thereof, but the present disclosure is not limited thereto.

The glass may be $SiO_2$-based or $B_2O_3$-based glass, and may include both $SiO_2$ and $B_2O_3$, but the present disclosure is not limited thereto.

The glass may contain a composition of $aSiO_2$-$bB_2O_3$-$cR^1_2O$ or a composition of $SiO_2$-$bB_2O_2$-$dR^2O$, but the present disclosure is not limited thereto. $R^1$ may be selected from a group consisting of lithium (Li), sodium (Na) and potassium (K), $R^2$ may be selected from a group consisting of magnesium (Mg), calcium (Ca), strontium (Sr) and barium (Ba), and a, b, c and d may be appropriately adjusted according to desired physical properties of the glass.

The first and second electrode layers 131a and 131b may be formed by sintering a paste containing a conductive metal and glass. The glass may be provided as glass frit within the paste.

The conductive resin layer 132 may be disposed on the first and second electrode layers 131a and 131b.

That is, the first and second electrode layers 131a and 131b may be disposed on an outer surface of the ceramic body, and the conductive resin layer 132 may be disposed on outer surfaces of the first and second electrode layers.

FIG. 3 is an enlarged view of part P of FIG. 2. Referring to FIG. 3, the conductive resin layer 132 according to the exemplary embodiment of the present disclosure may contain first copper particles 32a, second copper particles 32b, copper oxide particles 32c, and a base resin 32d.

The conductive resin layer may be formed of a conductive paste for external electrodes containing the first copper particles 32a, the second copper particles 32b, the copper oxide particles 32c, and the base resin 32d.

The first copper particle 32a, the second copper particle 32b, and the copper oxide particle 32c may be provided in plural.

As shown in FIG. 3, the first copper particles 32a, the second copper particles 32b, and the copper oxide particles 32c may contact each other or may be adjacent to each other in the conductive resin layer, and the base resin 32d may surround the first copper particles, the second copper particles, and the copper oxide particles.

The base resin 32d may be a thermosetting resin. Here, the base resin contained in the conductive paste for external electrodes may be a base resin before a curing process, and the base resin contained in the conductive resin layer may be a base resin after a curing process.

The thermosetting resin may be an epoxy resin.

A particle size of the second copper particle 32b may be smaller than that of the first copper particle 32a, and a particle size of the copper oxide particle 32c may be smaller than that of the second copper particle 32b.

The first copper particle 32a may have a spherical shape or a flake shape.

The conductive resin layer 132 formed on the first and second electrode layers may protect the multilayer ceramic electronic component from thermal, chemical, and physical stress, and may increase warpage strength of the multilayer ceramic electronic component.

In the case in which the conductive resin layer contains the base resin, the conductive resin layer may absorb external shock to protect the multilayer ceramic electronic component. However, since the base resin may be decomposed or may be burned out, it may be difficult to sinter the metal contained in the conductive resin layer at high temperature.

In the case in which the conductive resin layer contains the base resin, a current flow occurs due to contact of conductors contained therein and a tunneling effect, equivalent series inductance (ESR) may be increased as compared to a sintered electrode in which movement of electrons is relatively free.

However, according to the exemplary embodiment of the present disclosure, the conductive resin layer 132 may contain the first copper particles 32a and the second copper particles 32b smaller than the first copper particles, whereby the multilayer ceramic electronic component may have reduced ESR as compared to an existing multilayer ceramic electronic component.

The second copper particles 32b may contact the first copper particles or may be disposed between the first copper particles to thereby increase contact points between the copper particles, and the conductive resin layer 132 may contain the second copper particles 32b smaller than the first copper particles 32a, such that fraction of the copper particles contacting the first and second electrode layers in the conductive resin layer may be increased. In addition, fraction of the metal within the conductive resin layer may be increased. Therefore, the conductive resin layer 132 may contain a mixture of the first copper particles 32a and the second copper particles 32b, such that electric conductivity of the conductive resin layer may be increased and ESR may be reduced.

In addition, the copper oxide particles 32c may be contained in the conductive resin layer 132, thereby improving adhesion between the first and second electrode layers 131a and 131b containing the glass and the conductive resin layer 132.

According to the exemplary embodiment of the present disclosure, $Cu_2O$ of the copper oxide particles 32c contained in the conductive resin layer 132 and silicon (Si) of the glass contained in the electrode layers 131a and 131b are combined with each other to form a combination of Cu—O—Si, whereby adhesion between the first and second electrode layers 131a and 131b and the conductive resin layer 132 may be improved.

In the exemplary embodiment of the present disclosure, respective particle sizes of the first copper particle 32a, the second copper particle 32b, and the copper oxide particle 32c may be measured along major axes of the corresponding particles in length directions thereof.

According to an exemplary embodiment of the present disclosure, the first copper particles 32a may have a particle size of 1 μm or greater.

According to an exemplary embodiment of the present disclosure, the first copper particles 32a may have a particle size of 1 μm to 2.5 μm.

In the case in which the particle size of the first copper particle is less than 1 μm, a filling rate may be decreased, or due to an increase in a total surface area of the first copper particles, the base resin surrounding the first copper particles may be increased, resulting in an increase in resistance. In the case in which the first copper particles have a particle size greater than 2.5 μm, it may be difficult to form a thin external electrode.

According to an exemplary embodiment of the present disclosure, the second copper particles 32b may have a particle size of 50 nm to 200 nm. In the case in which the second copper particles have a particle size greater than 200 nm, a difference between the particle sizes of the first and second copper particles is reduced, whereby a reduction in ESR may not be significantly exhibited. In the case in which the particle size of the second copper particle is less than 50 nm, the second copper particles may be rapidly oxidized at the time of curing the conductive resin layer due to a high surface area rate of the second copper particles, resulting in an increase in resistance.

According to an exemplary embodiment of the present disclosure, the copper oxide particles 32c may have a particle size of 20 nm or less. In the case in which the copper oxide particles 32c have a particle size of 20 nm or less, adhesion between the electrode layers and the conductive resin layer may be further improved. In the case in which the particle size of the copper oxide particle 32c is greater than 20 nm, wetting properties resulting from the addition of the copper oxide particles may not be largely improved, whereby an effect of improving adhesion between the electrode layers and the conductive resin layer may be insignificant.

In order to further increase the effect of improving adhesion, the copper oxide particles may have a particle size of 15 nm or less.

In addition, according to an exemplary embodiment of the present disclosure, the copper oxide particles 32c may have a particle size of 2 nm or more. In the case in which the particle size of the copper oxide particle is less than 2 nm, when the conductive paste for external electrodes is dispersed for forming the conductive resin layer, copper oxides may not be uniformly dispersed on surfaces of the first and second copper particles, and it may be difficult to improve bonding strength due to agglomeration between the particles.

According to an exemplary embodiment of the present disclosure, the conductive resin layer 132 may contain the base resin 32d in a content of 5 wt % to 20 wt %.

In the case in which the content of the base resin is less than 5 wt %, adhesion strength of the conductive resin layer with respect to the electrode layer may be reduced, and in the case in which the content of the base resin is greater than 20 wt %, resistance of the conductive resin layer may be increased, and a non-plating phenomenon may occur when a plating layer is formed on the conductive resin layer, so that the plating layer is not uniformly formed on a surface of the conductive resin layer.

According to an exemplary embodiment of the present disclosure, the conductive resin layer 132 may contain copper particles including the first and second copper particles 32a and 32b in a content of 70 wt % to 90 wt %.

In the case in which the content of the copper particles is less than 70 wt %, ESR of the conductive resin layer may be increased due to an increase in intervals between conductors, and in the case in which the content of the copper particles is greater than 90 wt %, adhesion strength of the conductive resin layer with respect to the electrode layer may deteriorate due to a reduced amount of the base resin in the conductive resin layer.

According to an exemplary embodiment of the present disclosure, the copper oxide particles 32c may be contained in 2 to 20 parts by weight, based on 100 parts by weight of the copper particles 32a and 32b. In the case in which the content of the copper oxide particles is less than 2 parts by weight based on 100 parts by weight of the copper particles, a low ratio of the copper oxide particles in the conductive resin layer may cause difficulty in bonding the copper oxide particles to the glass contained in the electrode layer, and in the case in which the content of the copper oxide particles is greater than 20 parts by weight based on 100 parts by weight of the copper particles, an excessive amount of the copper oxide particles is provided between the first and second copper particles, causing interference in an electrical flow, whereby resistance may be increased.

The second copper particles 32b and the copper oxide particles 32c may be contained in the conductive resin layer in a ratio of 2:1 to 20:1 (the second copper particles:the copper oxide particles). In the case in which the copper oxide particles are largely contained so that the ratio between the second copper particles and the copper oxide particles is out of 2:1, the excessive amount of the copper oxide particles surround the surfaces of the second copper particles, resulting in an increase in ESR of the external electrodes. In the case in which the copper oxide particles are less contained so that the ratio between the second copper particles and the copper oxide particles is out of 20:1, the content of the copper oxide particles is reduced, whereby an increase in adhesion strength between the electrode layers and the conductive resin layer may be insignificant.

According to an exemplary embodiment of the present disclosure, 50% or greater of the copper oxide particles 32c contained in the conductive resin layer 132 may be disposed on the surfaces of the second copper particles 32b. At the time of preparing the paste for forming the conductive resin layer, the copper oxide particles may be previously dispersed onto the surfaces of the second copper particles, such that 50% or greater of the copper oxide particles are disposed on the surfaces of the second copper particles 32 as described above.

For example, the second copper particles may be firstly formed to have the dispersed oxide copper particles disposed on the surfaces thereof, and then, the paste for the conductive resin layer may be prepared by mixing the second copper particles, the first copper particles, the base resin, and the like. In this case, 50% or greater of the copper oxide particles may be disposed on the surfaces of the second copper particles 32.

In the case in which the paste for forming the conductive resin layer is prepared by previously dispersing the copper oxide particles onto the surfaces of the second copper particles as described above, this may result in an increased surface area in which dispersibility between the particles may be improved.

In addition, when 50% or greater of the copper oxide particles are disposed on the surfaces of the second copper particles, agglomeration between the copper oxide particles in the conductive resin layer may be prevented, and thus, an increase in ESR of the external electrodes may be prevented.

According to an exemplary embodiment of the present disclosure, the external electrodes 130a and 130b may further include plating layers 133 formed on the conductive resin layers 132. The plating layer 133 may include a nickel plating layer and a tin plating layer, wherein the nickel plating layer may be disposed on the conductive resin layer and the tin plating layer may be disposed on the nickel plating layer.

According to this embodiment of the present disclosure, the conductive resin layer may contain the first copper particles, the second copper particles, and the copper oxide particles, whereby it is capable of protecting the multilayer ceramic electronic component from external stress, absorbing external shock, preventing a plating solution from being infiltrated, and having low ESR and improved adhesion between the electrode layers and the conductive resin layers.

A conductive paste for external electrodes according to another exemplary embodiment of the present disclosure may contain first copper particles; second copper particles smaller than the first copper particles; copper oxide particles having a particle size of 2 nm to 20 nm; and a base resin.

The conductive resin layer of the above-described multilayer ceramic electronic component may be formed using the conductive paste for external electrodes according to this embodiment of the present disclosure. That is, the conductive paste for external electrodes according to the present embodiment may be a paste for forming the conductive resin layer of the above-described multilayer ceramic electronic component.

The first copper particles contained in the conductive paste for external electrodes may have a particle size of 1 μm or more, and preferably, 1 μm to 2.5 μm.

The second copper particles may have a particle size of 50 nm to 200 nm.

The copper oxide particles may have a particle size of 20 nm or less, and preferably, 2 nm to 20 nm.

The copper oxide particles may be contained in 2 to 20 parts by weight, based on 100 parts by weight of the copper particles including the first and second copper particles.

According to an exemplary embodiment of the present disclosure, the second copper particles and the copper oxide particles may be contained in a ratio of 2:1 to 20:1.

The conductive paste for external electrodes may further contain a solvent for adjusting viscosity, if necessary.

Since a detailed description of the conductive paste for external electrodes in the present embodiment is overlapped with that of the paste for forming the conductive resin layer of the multilayer ceramic electronic component according to the previous embodiment, a redundant description will be omitted.

As set forth above, according to exemplary embodiments of the present disclosure, there may be provided a conductive paste for external electrodes capable of protecting a multilayer ceramic electronic component from external stress, absorbing shock, preventing a plating solution from being infiltrated, and having low ESR and improved adhesion between electrode layers and conductive resin layers, and a multilayer ceramic electronic component manufactured using the same.

While exemplary embodiments have been shown and described above, it will be apparent to those skilled in the art that modifications and variations could be made without departing from the spirit and scope of the present disclosure as defined by the appended claims.

What is claimed is:

1. A multilayer ceramic electronic component, comprising:
   a ceramic body including a plurality of dielectric layers and a plurality of internal electrodes;
   electrode layers disposed on outer surfaces of the ceramic body to be electrically connected to the internal electrodes and containing a conductive metal and glass; and
   a conductive resin layer disposed on the electrode layer and containing first copper particles, second copper particles smaller than the first copper particles, copper oxide particles smaller than the second copper particles, and a base resin,
   wherein the copper oxide particles have a particle size of 20 nm or less.

2. The multilayer ceramic electronic component of claim 1, wherein 50% or greater of the copper oxide particles contained in the conductive resin layer are disposed on surfaces of the second copper particles.

3. The multilayer ceramic electronic component of claim 1, wherein the copper oxide particles have a particle size of 2 nm to 15 nm.

4. The multilayer ceramic electronic component of claim 1, wherein the second copper particles have a particle size of 50 nm to 200 nm.

5. The multilayer ceramic electronic component of claim 1, wherein the copper oxide particles are contained in 2 to 20 parts by weight, based on 100 parts by weight of the first and second copper particles.

6. The multilayer ceramic electronic component of claim 1, wherein the conductive resin layer contains the second copper particles and the copper oxide particles in a ratio of 2:1 to 20:1.

7. The multilayer ceramic electronic component of claim 1, wherein the first copper particles have a particle size of 1 μm or more.

8. The multilayer ceramic electronic component of claim 1, wherein the first copper particles have a particle size of 1 μm to 2.5 μm.

9. A conductive paste for external electrodes, the conductive paste comprising:
   first copper particles;
   second copper particles smaller than the first copper particles;
   copper oxide particles having a particle size of 20 nm or less; and
   a base resin.

10. The conductive paste of claim 9, wherein the second copper particles have a particle size of 50 nm to 200 nm.

11. The conductive paste of claim 9, wherein the copper oxide particles are contained in 2 to 20 parts by weight, based on 100 parts by weight of the first and second copper particles.

12. The conductive paste of claim 9, wherein the second copper particles and the copper oxide particles are contained in a ratio of 2:1 to 20:1.

13. The conductive paste of claim 9, wherein the first copper particles have a particle size of 1 μm or more.

14. The conductive paste of claim 9, wherein the first copper particles have a particle size of 1 μm to 2.5 μm.

* * * * *